United States Patent
Hynds et al.

[11] Patent Number: 5,112,031
[45] Date of Patent: May 12, 1992

[54] INTERLOCKING MOUNTING BUSHING ASSEMBLY FOR A STABILIZER BAR

[75] Inventors: Ernest J. Hynds; Keith A. Stowe, both of Saginaw, Mich.

[73] Assignee: General Motors Corporation, Detroit, Mich.

[21] Appl. No.: 572,297

[22] Filed: Aug. 27, 1990

[51] Int. Cl.⁵ .................. B60G 7/04; F16F 1/16; F16B 21/07
[52] U.S. Cl. .................... 267/276; 248/221.4
[58] Field of Search ............ 267/276, 277, 279–282; 248/221.4; 403/240, 362, 364; 446/120, 121, 123, 103, 95; 280/721; 24/459

[56] References Cited

U.S. PATENT DOCUMENTS

| | | | |
|---|---|---|---|
| 3,856,246 | 12/1974 | Sinko | 24/459 X |
| 4,618,114 | 10/1986 | McFarland | 248/221.4 X |
| 4,997,148 | 3/1991 | Sherman | 248/74.1 |

FOREIGN PATENT DOCUMENTS

| | | | |
|---|---|---|---|
| 93625 | 11/1983 | European Pat. Off. | 267/276 |
| 381566 | 8/1990 | European Pat. Off. | 267/276 |

*Primary Examiner*—George E. A. Halvosa
*Assistant Examiner*—Alfred Muratori
*Attorney, Agent, or Firm*—A. Michael Tucker

[57] ABSTRACT

A mounting bushing block for a stabilizer bar includes a central body having a pair of flexible projecting legs. A semicircular seat is provided in the body for receiving a tubular stabilizer bar. A second bushing block formed identical to the first bushing block includes a semicircular seat for receiving the stabilizer bar and indentations for receiving the legs of the first bushing blocks. The bushing blocks are snapped together with respect to one another and then mounted on the stabilizer bar to provide a mounting assembly for snap-on connection to a chassis.

9 Claims, 2 Drawing Sheets

INTERLOCKING MOUNTING BUSHING ASSEMBLY FOR A STABILIZER BAR

BACKGROUND OF THE INVENTION

1. Field of the Invention

The present invention relates generally to vehicular suspension systems and, in particular, is concerned with an improved mounting bushing assembly for a stabilizer bar.

2. Statement of the Related Art

The use of stabilizer bars in automotive wheel suspension systems is well-known. Generally, the stabilizer bar is a torsion spring that connects the opposite wheels so that it resists motion only when the wheels are moving in opposite directions. The purpose of the stabilizer bar is to increase roll stiffness of the suspension without increasing the ride stiffness. Stabilizer bars affect handling control response characteristics by changing normal tire loading and its cornering stiffness.

Mounting bushings for the stabilizer bar act as bearings and provide space between the bar and the chassis at mounting points. Furthermore, the bushings support and locate the bar on the chassis. Conventional bushings include a rubber bushing compressed into a stamped sheet metal bracket attached to the chassis via a cradle using two bolts. The nuts for the bolts are welded onto the cradle.

Mounting of the stabilizer bar onto a chassis begins by opening a hole provided in each rubber bushing so that it can accept the bar. The mounted rubber bushing is moved along the bar and rotated to its approximate operating position with respect to the cradle. The rubber is then compressed roughly 25 percent into a mounting bracket. While compressing the rubber bushing between the bracket and the cradle, bolts are threaded into weld nuts mounted on the cradle. Once the bushings and end forms on the stabilizer bar are loosely fastened, then each fastener is securely tightened.

The art continues to seek improvements. In particular, it is desirable to provide a mounting bushing for a stabilizer bar which is quick and easy to assemble.

SUMMARY OF THE INVENTION

The present invention includes an improved mounting bushing assembly for a stabilizer bar. The mounting bushing assembly is economical to manufacture and easy to assemble. In particular, a bushing block includes a seat for receiving a stabilizer bar and a pair of legs which act as locking tabs. A pair of the bushing blocks are quickly fitted onto a stabilizer bar and snapped into place. The bushing assembly is then easily manipulated on the bar to a desired location with respect to the chassis.

In a preferred embodiment, a mounting bushing block for a stabilizer bar includes a central body having a pair of flexible projecting legs. A semicircular seat is provided in the body for receiving a tubular stabilizer bar. A second bushing block formed identical to the first bushing block includes a semicircular seat for receiving the stabilizer bar and indentations for receiving the legs of the first bushing blocks. The bushing blocks are snapped together with respect to one another and then mounted on the stabilizer bar to provide a mounting assembly for snap-on connection to a chassis.

DETAILED DESCRIPTION OF THE PREFERRED EMBODIMENT

Figure 1:
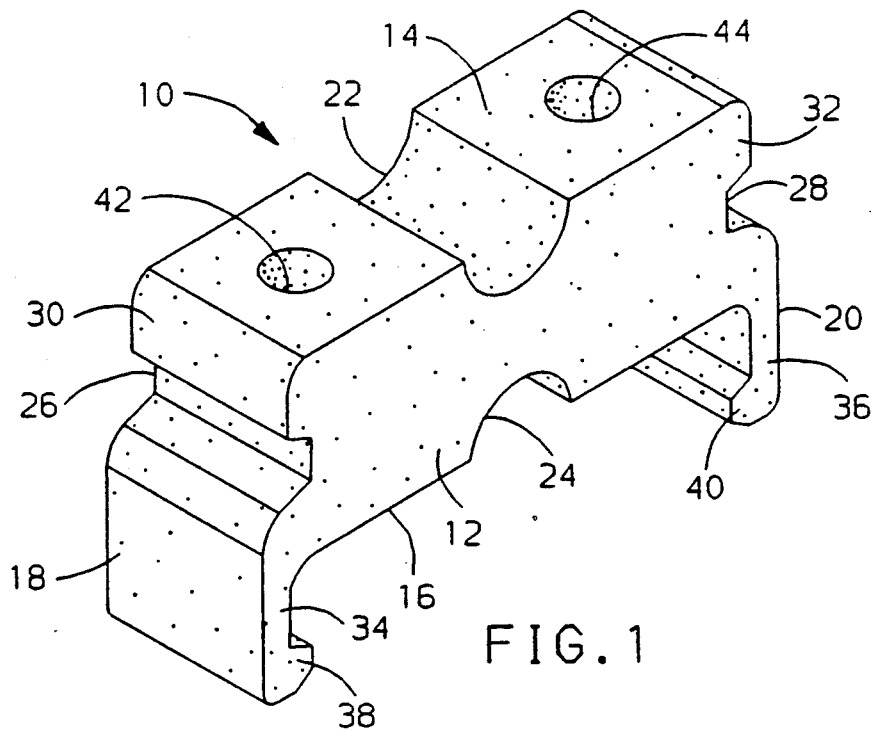
FIG. 1 is a perspective view of a preferred embodiment of a mounting bushing block according to the present invention.

A mounting bushing block indicated generally at 10 is illustrated in FIG. 1. The block 10 includes a planar body 12 having a first or upper surface 14, a second or lower surface 16, and a pair of end surfaces 18,20. A semicircular seat 22 is provided at the approximate center of the upper surface 14 and a complementary semicircular seat 24 is provided at the approximate center of the lower surface 16. Preferably, the radius of the first seat 22 is approximately equal to the radius of the second seat 25. An indentation 26, 28 is provided near the central portion of ®each respective end surface 18, 20. Preferably, a reduced-width mounting ear 30, 32 is formed between respective indentations 26, 28 and the upper surface 14.

A pair of resilient, extending legs 34, 36 project downwardly from the lower surface 16. Preferably, the body 12 and the legs 34, 36 are integrally molded from a suitable polymeric material. Each leg 34, 36 terminates in a respective locking tab 38, 40. Preferably, the locking tabs 38, 40 are formed complementary to the indentations 26, 28. An opening 42 through the body 12 is provided from the upper surface 14 to the lower surface 16 between the indentation 26 and the seats 22, 24. A similar opening 44 is provided through the body 12 between the seats 22, 24 and the indentation 28.

Figure 2:
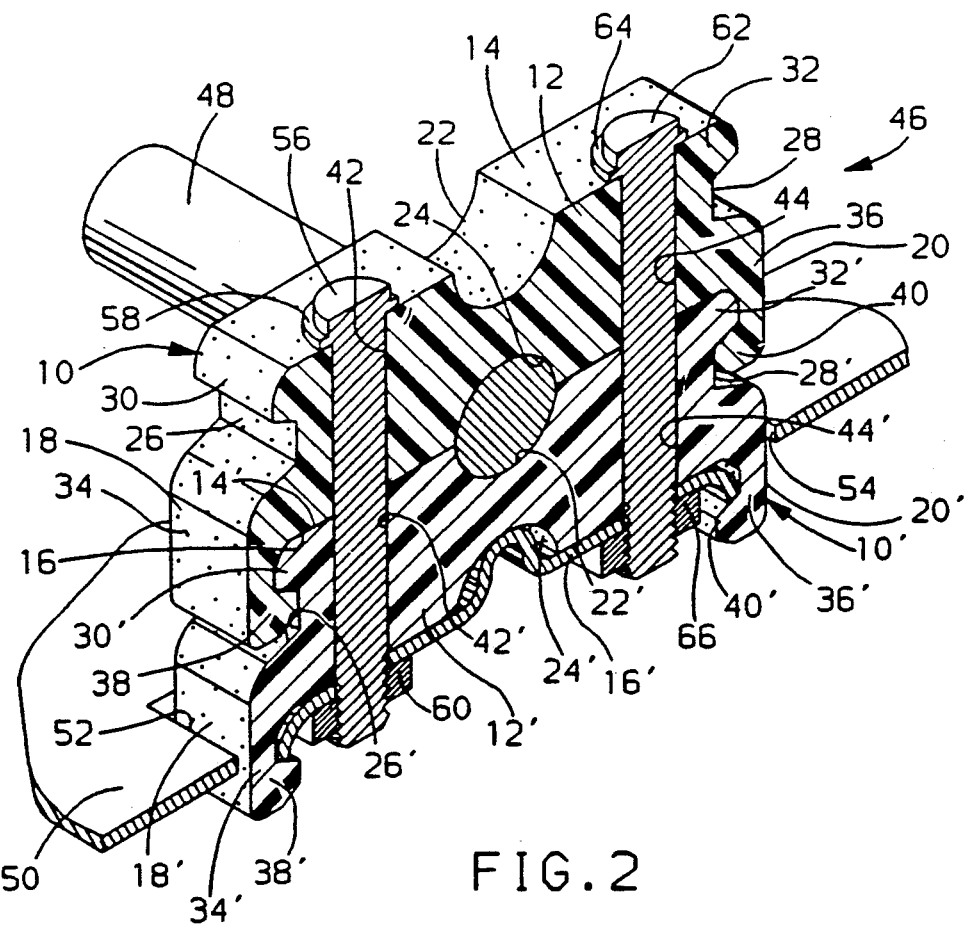
FIG. 2 is a sectional view of a pair of mounting bushing blocks of the type illustrated in FIG. 1 snapped together and mounted on a stabilizer bar to form a mounting assembly on a chassis.

A bushing assembly 46 mounting a tubular stabilizer bar 48 is illustrated in FIG. 2. The bushing assembly 46 comprises a first bushing block 10 removably connected to a second bushing block indicated at 10'. It is understood that bushing block 10' is identical to bushing block 10. For purposes of this description, all elements of block 10' will be designated by the same reference numeral for block 10 followed by a prime (') symbol.

For assembly of the bushing assembly 46, the stabilizer bar 48 is received in the upper seat 22' of block 10'. Block 10 is snapped onto block 10' as resilient legs 34, 36 slide over respective mounting ears 30', 32' until the locking tabs 38, 40 are received in respective indentations 26', 28' and the stabilizer bar 48 is received in the lower seat 24. When assembled, it is apparent that the radii of the seats 22' and 24 are slightly greater that the diameter of the stabilizer bar 48 so that the stabilizer bar 48 may turn freely within the bushing assembly 46.

A plurality of bushing assemblies 46 are mounted on the stabilizer bar 48 as described above. The bar 48 is then positioned adjacent a vehicle chassis (not illustrated) so that each bushing assembly 46 can be mounted on a respective cradle 50, which is connected to the chassis. A pair of openings 52, 54 are provided in the cradle 50 to receive the legs 34', 36' of block 10, The legs 34', 36' are pressed into respective openings 52, 54 and retained by the locking tabs 38', 40'. A retaining bolt 56 having a flange 58 is inserted into openings 42, 42' of the blocks 10, 10'. A nut 60 is welded to the cradle 50 and receives the opposite end of the bolt 56. In a similar manner, a bolt 62 having a flange 64 is passed through openings 44, 44' to be threaded to nut 66.

Figure 3:
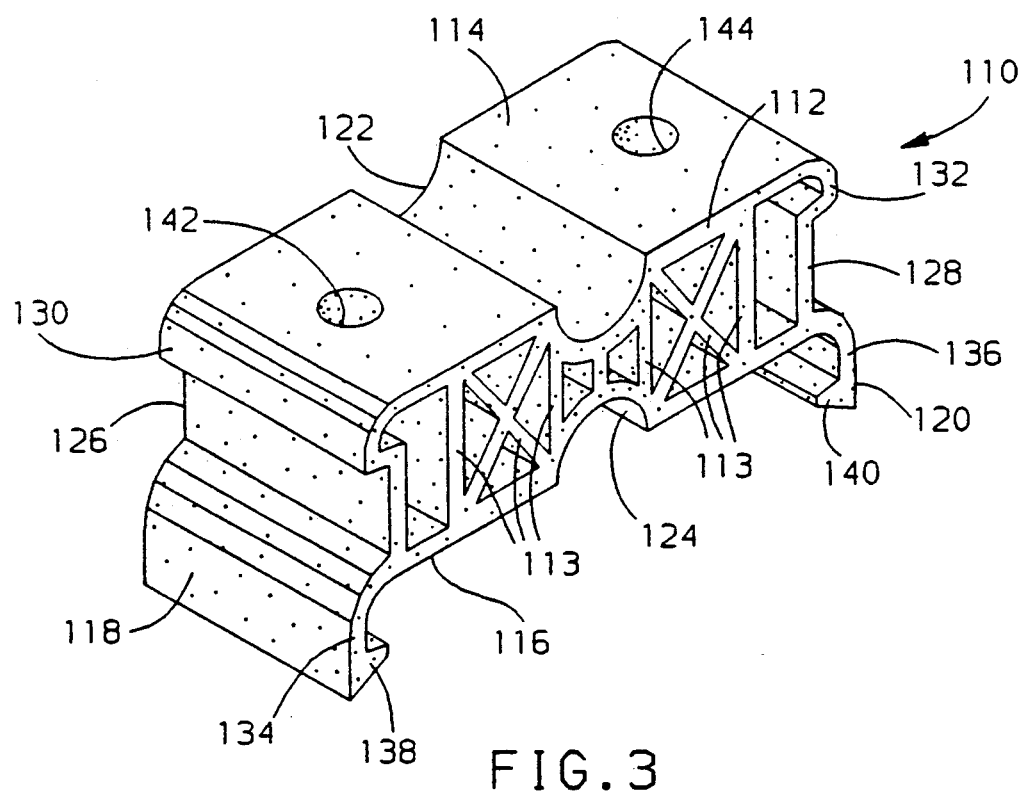
FIG. 3 is a perspective view of a second embodiment of a mounting bushing block according to the present invention having a hollow body with reinforcing ribs.

A second embodiment of the present mounting bushing block is indicated generally at 110 and illustrated in FIG. 3. The block 110 includes similar elements as block 10, and each element is designated with a corresponding reference numeral in the 100 series as shown in FIG. 3. In particular, the block 110 is a lightweight, molded member having a hollow planar body 112. A plurality of reinforcing ribs 113 is provided between the upper surface 114, the lower surface 116 and the end surfaces 118, 120 to provide strength and stress-resistance. The legs 134, 136 and all other features of the block 110 act in the same manner as corresponding elements of the block 10 as described above.

Although the present invention has been described with reference to preferred embodiments, workers skilled in the art will recognize that changes may be made in form and detail without departing from the spirit and scope of the invention.

We claim:

1. A bushing assembly for mounting a rotatable tubular stabilizer bar to a vehicular chassis, the assembly comprising:
    a first bushing block having a seat for rotatably seating the stabilizer bar;
    a second bushing block substantially identical to the first block having a seat for rotatably seating the stabilizer bar;
    first locking means provided on the first bushing block for snap fitting the first bushing block to the second bushing block; and
    second locking means provided on the second bushing block for snap fitting the second bushing block to the chassis.

2. The bushing assembly specified in claim 1 wherein:
    the first bushing block and the first locking means are integrally molded; and
    the second bushing block and the second locking means are integrally molded.

3. The bushing assembly specified in claim 1 wherein the first locking means comprises a pair of resilient legs projecting from the first bushing block, each leg terminating in a locking tab.

4. The bushing assembly specified in claim 3 wherein the first bushing block and the legs are integrally molded.

5. The bushing assembly specified in claim 1 wherein the second locking means comprises a pair of resilient legs projecting from the second bushing block, each leg terminating in a locking tab.

6. The bushing assembly specified in claim 5 wherein the second bushing block and the legs are integrally molded.

7. A mounting assembly for a vehicular suspension system, comprising:
    (a) a rotatable stabilizer bar;
    (b) a first bushing block having upper, lower and opposite end surfaces, wherein
        (i) semicircular seats are provided in the upper and lower surfaces,
        (ii) leg means extend from the lower surface and terminate in locking means, and
        (iii) indentation means are provided in the end surfaces; and
    (c) a second bushing block substantially identical to and removably connected with the first bushing block so that the lower semicircular seat of the first block and the upper semicircular seat of the second block form a circular seat for the stabilizer bar as the leg means of the first block are received in the indentation means of the second block, wherein the locking means of the second block removably connects the assembly to a vehicle.

8. The mounting assembly specified in claim 7 wherein the locking means of the first and second blocks comprises a tab complementary to the indentation means.

9. The mounting assembly specified in claim 7 wherein each of the first and second blocks is a molded member.

* * * * *